(12) United States Patent
Ford et al.

(10) Patent No.: US 11,181,189 B2
(45) Date of Patent: Nov. 23, 2021

(54) VEHICLE SHIFTER MECHANISM WITH SHIFTER LEVER FITTING

(71) Applicant: Lokar, Inc., Knoxville, TN (US)

(72) Inventors: Kevin S. Ford, Knoxville, TN (US); Van Walls, Knoxville, TN (US)

(73) Assignee: Lokar, Inc., Knoxville, TN (US)

( * ) Notice: Subject to any disclaimer, the term of this patent is extended or adjusted under 35 U.S.C. 154(b) by 405 days.

(21) Appl. No.: 16/162,504

(22) Filed: Oct. 17, 2018

(65) Prior Publication Data

US 2019/0113134 A1    Apr. 18, 2019

Related U.S. Application Data

(60) Provisional application No. 62/573,505, filed on Oct. 17, 2017.

(51) Int. Cl.
| | |
|---|---|
| *F16H 59/10* | (2006.01) |
| *F16B 37/00* | (2006.01) |
| *F16H 59/02* | (2006.01) |
| *F16L 19/06* | (2006.01) |
| *F16L 19/065* | (2006.01) |
| *F16B 7/14* | (2006.01) |

(52) U.S. Cl.
CPC ............. *F16H 59/10* (2013.01); *F16B 7/149* (2013.01); *F16B 37/00* (2013.01); *F16H 59/0278* (2013.01); *F16L 19/061* (2013.01); *F16L 19/065* (2013.01)

(58) Field of Classification Search
CPC .......... F16D 1/09; F16D 1/0903; F16D 1/092; F16D 1/093; F16D 1/094; F16D 1/095; F16D 1/096; F16D 1/097; F16C 2226/16; F16L 19/065

USPC ....... 403/277, 278, 280, 281, 282, 292, 293, 403/296, 297, 309, 314
See application file for complete search history.

(56) References Cited

U.S. PATENT DOCUMENTS

| | | | | | |
|---|---|---|---|---|---|
| 1,429,940 | A | * | 9/1922 | Field | F16B 7/149 |
| | | | | | 74/544 |
| 1,978,047 | A | * | 10/1934 | Haury | F16L 19/065 |
| | | | | | 277/622 |
| 3,103,373 | A | * | 9/1963 | Lennon | F16L 19/103 |
| | | | | | 285/342 |
| 3,747,431 | A | * | 7/1973 | Uhlenhaut | B60K 20/02 |
| | | | | | 74/524 |

(Continued)

OTHER PUBLICATIONS

Lokar Performance Products, "GM Tailmount Transmission Shifter Installation Instructions", rev. Jun. 24, 2014, 6 pages (Year: 2014).*

*Primary Examiner* — Victor L MacArthur

(57) ABSTRACT

A vehicle shifter mechanism comprises a shift control member configured with an outer threaded portion proximate an upper end, and an inwardly tapered bore proximate the upper end. A shift lever is configured with an outwardly extending annular shoulder proximate a lower end. The annular shoulder has a tapered lower portion configured to register with the tapered bore of the shift control member. A locking nut is configured to fit over the shift lever and to mate with the threaded portion of the shift control member to compress the tapered lower portion of the annular shoulder to the tapered bore to fix the shift control member to the shift lever.

18 Claims, 3 Drawing Sheets

(56) References Cited

U.S. PATENT DOCUMENTS

| | | | | |
|---|---|---|---|---|
| 5,284,400 A * | 2/1994 | Thomas | ............... | B60K 20/02 |
| | | | | 403/243 |
| 5,452,623 A * | 9/1995 | Knight | ............... | B60K 20/04 |
| | | | | 403/225 |
| 7,546,693 B1 * | 6/2009 | Impellizeri | ............ | G01F 23/04 |
| | | | | 33/722 |
| 9,726,309 B1 * | 8/2017 | Rowley | ............... | F16L 19/061 |
| 2008/0314186 A1 * | 12/2008 | Ford | ............... | F16H 59/0278 |
| | | | | 74/473.23 |

* cited by examiner

VEHICLE SHIFTER MECHANISM WITH SHIFTER LEVER FITTING

CROSS-REFERENCE TO RELATED APPLICATIONS

This application claims the benefit of U.S. Provisional Patent Application No. 62/573,505, filed on Oct. 17, 2017

STATEMENT REGARDING FEDERALLY-SPONSORED RESEARCH OR DEVELOPMENT

Not Applicable

BACKGROUND OF THE INVENTION

1. Field of Invention

The present general inventive concept relates to vehicle shifter mechanisms, and, more particularly, to a coupling for a shifter lever portion of a shifter mechanism which allows for convenient installation of a shifter lever in a vehicle.

2. Description of the Related Art

Vehicle shifters of the type having a lever configured to allow a user to shift gears and/or shift automatic transmission settings of the vehicle are known generally in the art. Typical prior art designs for vehicle shifters often incorporate a "boot" portion which is mounted to an interior surface of a vehicle. The boot portion surrounds a lower portion of a shift lever which is coupled through appropriate linkages to a main body of the vehicle shifter and serves as a control lever for the vehicle shifter. An upper portion of the shift lever extends from the boot into the vehicle interior and typically includes a ball, knob, or other suitable handle mounted at the upper end thereof to allow a user to grasp the shifter lever upper end and actuate it to a number of positions, thereby effecting gear shifting of the vehicle. In many designs, one or more suitable buttons or other lockout controls may be provided on or near the upper handle of the shifter lever to control a lockout feature of the shifter lever, such that in order for the lever to be moved to one or more setting positions, the button must be pushed in order to release the shifter lever. Suitable cables or other linkages may be provided along an interior of the shifter lever in order to mechanically couple the one or more buttons to the lockout components which, in many designs, may be mounted beneath the boot.

In many circumstances, it is desirable to remove and/or replace the shifter lever of a vehicle shifter while the vehicle shifter remains otherwise installed in the vehicle. Numerous designs exist for aftermarket shift levers which may be installed to replace existing vehicle shift levers in order to improve the aesthetics of the vehicle interior and/or to provide improved strength and/or stability to the shift lever. However, many such designs for aftermarket shift levers are threaded at both lower and upper ends thereof. These designs require that, in order for the shift lever to be installed, the lever must be rotated about an axis thereof to threadably couple a lower end of the aftermarket shift lever with a corresponding portion of the vehicle shifter. These designs further require that, in order for a shifter knob to be installed, the knob must be rotated to threadably couple an upper end of the aftermarket shift lever with the shifter knob. This presents numerous disadvantages during installation. For example, these designs do not allow for selective rotatable orientation of the lever and/or shifter knob once the knob is fully threaded onto the lever and the lever is fully threaded into the shifter device.

Furthermore, various designs for aftermarket shift levers include one or more bends in the shift lever, which may serve, for example, to offset the shift knob from a position directly above the shifter boot and/or which may be included for aesthetic reasons. In installation of such designs, rotation of the aftermarket shift lever about lower threads thereof may result in the upper end of the shift lever swinging along a wide path. For certain vehicles, space constraints within the vehicle cab may impair installation of such shift levers. For example, in certain circumstances, it may be necessary to remove the dashboard and/or vehicle seats in order to allow sufficient space within the vehicle cab to allow installation of such shift levers. This results in a difficult and time consuming installation.

In light of the above, there is a need in the art for a vehicle shifter mechanism which allows for easier and more convenient installation of a shifter lever than is provided in the above-discussed prior art designs. There is further need in the art for a vehicle shifter mechanism which allows the ability to rotatably orient the shifter lever and/or associated shifter knob as desired.

BRIEF SUMMARY OF THE INVENTION

The present general inventive concept, in various example embodiments, provides a vehicle shifter mechanism comprising a shift lever, a shift rod which is threaded on one end and has a swaged opening internal to the threaded end, a compression nut with a thread pattern compatible with the shift rod threads, and a ferrule with an inner diameter generally corresponding to an outer diameter of a lower end of the shift lever and an outer diameter generally corresponding to the swaged opening of the shift rod. Downward force on the ferrule inside the swaged opening of the shift rod compresses the ferrule in a circumferential direction so that it rests snuggly about the lower end of the shift lever. The shift lever and ferrule thus resist forces in a upward direction, so that the shift lever remains in position relative to the shift rod.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION OF THE INVENTION

Reference will now be made to the example embodiments of the present general inventive concept, examples of which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
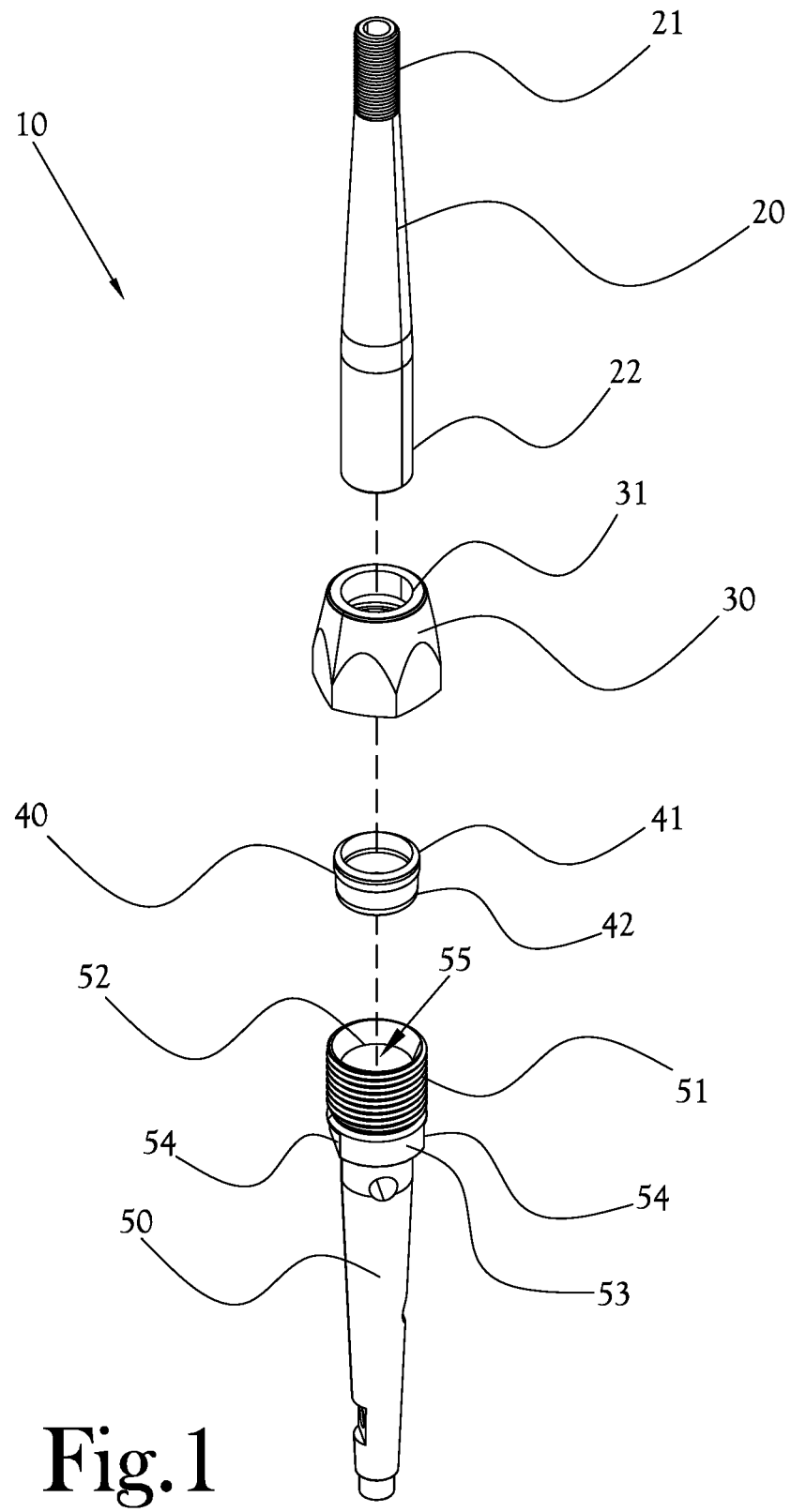
FIG. 1 is an exploded perspective view showing the component parts of one embodiment of a shifter mechanism constructed in accordance with several features of the present general inventive concept.
Figure 2:
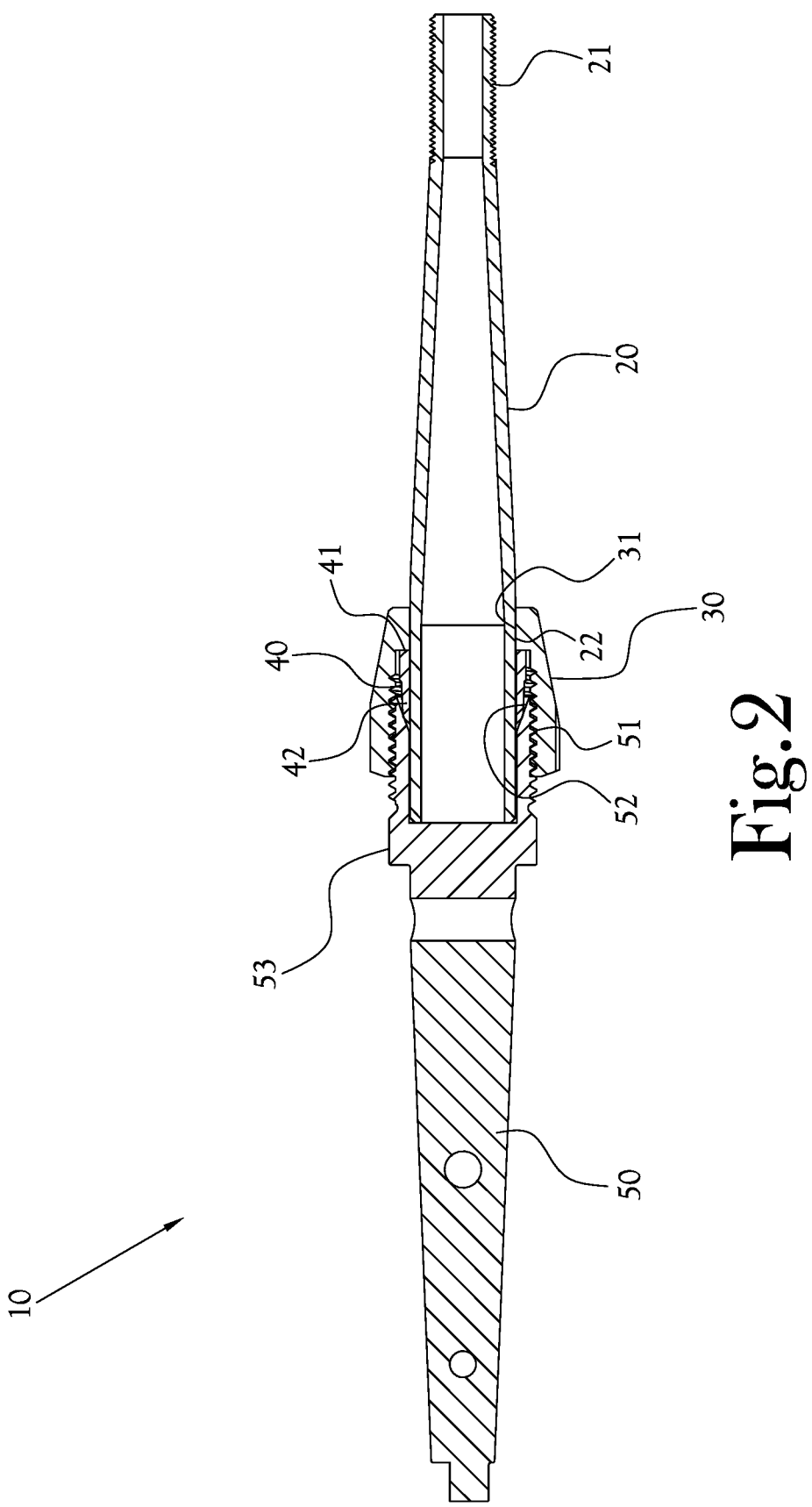
FIG. 2 is a cross-sectional view showing the embodiment of the shifter mechanism of FIG. 1.
Figure 3:
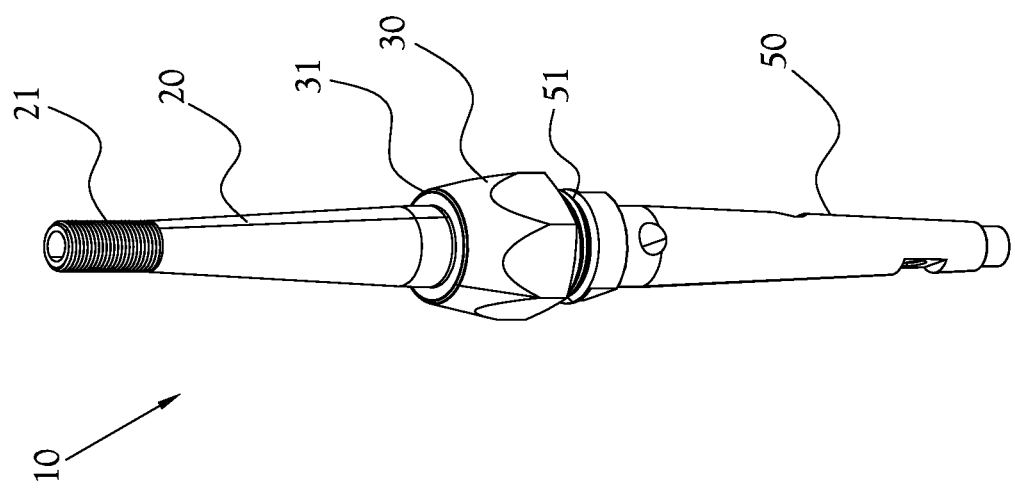
FIG. 3 is a perspective view showing the embodiment of a shifter mechanism of FIG. 1.

With reference generally to FIGS. 1-3, and with particular reference to FIG. 1, in one embodiment constructed in accordance with various features of the present general inventive concept, a vehicle shifter mechanism with shifter lever fitting 10 is provided which allows for convenient installation of a shifter lever in a vehicle. In the illustrated embodiment, an elongated shifter lever 20 is shown having generally an upper end 21 and opposite lower end 22. The upper end 21 and lower end 22 each, in the illustrated embodiment, define cylindrical outer surfaces, and a central portion of the lever 20 defines a gradual taper, such that the outer circumference of the lower end 22 is greater than the outer circumference of the upper end 21. In the illustrated embodiment, the upper end 21 defines threads along an exterior surface thereof for accepting a shifter knob (not shown) in threadable engagement therewith. The lower end 22 of the lever 20 defines a generally smooth outer surface.

An annular compression ferrule 40 is provided having an inner surface which is generally sized to correspond to the outer surface of the lever lower end 22. The ferrule 40 is received onto the lever lower end 22 and surrounds an outer circumference of the lever lower end 22 to establish frictional engagement therewith. It will be recognized that, in other embodiments, connection and/or engagement between the ferrule 40 and the lever lower end 22 may be established by other means of the type known to one of skill in the art, such as for example by adhesive or weld, screw fastener, threadably mating connection, or integral connection. The ferrule 40 has an upper circumferential end 41 which defines an annular shoulder surrounding and extending outwardly from the lever lower end 22. The ferrule 40 further has a lower circumferential end 42 which defines an inwardly tapered portion.

FIGS. 1-3 further illustrate a shift control member, and more specifically, a shift rod 50 having various indents and bores defined therein of the type known for use in allowing the shift rod 50 to couple with and operatively engage various control portions of a vehicle shifter. In the illustrated embodiment, the shift rod 50 defines a generally tapered main body portion and an upper portion 51 having a substantially cylindrical outer surface defining threads along the upper end thereof. Between the threads and the tapered main body portion of the shift rod 50, an annular portion 53 is defined extending outwardly from a lower circumferential portion of the shift rod upper portion 51. The annular portion 53 has a pair of oppositely disposed flat surfaces 54 which are suitable for being grasped by a wrench, pliers, or other such tool in order to facilitate secure handling of the shift rod 50.

An upper end of the shift rod 50, opposite the main body portion, defines an annular blind bore 55 extending from an upper surface of the shift rod 50 axially inwardly along a central axis of the shift rod 50. The blind bore 55 is sized to receive therein lower portions of the ferrule 40 and the lever lower end 22. The blind bore 55 defines an upper circumferential rim having an outwardly flared swaged opening 52 which is sized and shaped to correspond with, and matably engage, the inwardly tapered portion of the lower end of the ferrule 40. Thus, when the lower portions of the ferrule 40 and the lever lower end 22 are received within the blind bore 55, the inwardly tapered portion of the lower end of the ferrule 40 mates with and engages the outwardly flared swaged opening 52 of the blind bore 55 to position the lower end of the lever 20 in axial alignment with the blind bore 55, and thus, in axial alignment with the shift rod 50.

Also illustrated in FIGS. 1-3 is a compression nut 30 which is sized and shaped to secure the ferrule 40 and the lower end 22 of the lever 20 in axial alignment with the blind bore 55. More specifically, in the illustrated embodiment, the compression nut 30 defines a hexagonal outer surface and a cylindrical inner surface having threads defined thereon. The compression nut inner surface and associated threads are sized and shaped to allow a lower portion of the compression nut 30 to be received around, and to threadably mate with and engage, the outer threads defined along the upper portion 51 of the shift rod 50. An upper end of the compression nut 30 defines an inwardly-extending, annular collar 31 having an internal diameter which is sized to correspond generally to the outer diameter of the lower end 22 of the lever 20, but which is sized smaller than the outer diameter of the annular shoulder of the ferrule 40. Thus, when the lower portions of the ferrule 40 and the lever lower end 22 are received within the blind bore 55, such that the lower end of the lever 20 is in axial alignment and/or registration with the blind bore 55, the compression nut 30 may be slid over the upper end 21 of the lever 20 and moved downwardly toward the shift rod 50, until the inner threads of the compression nut 30 meet the outer threads of the upper portion 51 of the shift rod 50. Thereafter, the compression nut 30 may be threadably received onto the upper portion 51 of the shift rod 50, such that the annular collar 31 exerts pressure along upper surfaces of the annular shoulder of the ferrule 40, thereby securing the lower end of the ferrule 40 in mating engagement with the outwardly flared swaged opening 52 of the blind bore 55.

It will be recognized that the vehicle shifter mechanism 10 illustrated in FIGS. 1-3 allows for installation of the shifter lever 20 absent the need to rotate the lever 20 about its central axis. The vehicle shifter mechanism 10 alternatively allows for selective rotational adjustment of the shifter lever 20 during installation. In this regard, when the lower portions of the ferrule 40 and the lever lower end 22 are received within the blind bore 55, such that the lower end of the lever 20 is in axial alignment and/or registration with the blind bore 55, the lever 20 may be rotated about its central axis to bring the lever 20 to a desired rotational position in relation to the shift rod 50. Thereafter, the compression nut 30 may be tightened onto the upper portion 51 of the shift rod 50, thereby "locking" the shifter lever 20 in the desired position.

FIG. 3 is a perspective view showing the vehicle shifter mechanism 10 as assembled. In this illustration, the compression nut 30 is threaded onto the shift rod 50. The ferrule 40, which is not visible in FIG. 3, is assembled onto the lower end of the lever 20, and the lower end 22 of the lever 20 and the ferrule 40 are maintained in compression within the swaged opening 52 and the blind bore 55 of the shift rod 50. The downward force on the ferrule 40 inside the swaged opening 52 of the shift rod 50 serves to compress the ferrule 40 in an axial direction along the lever 20 and shift rod 50, so that the ferrule 40 fits tightly both around the lower end of the lever 20 and within the swaged opening 52. In this configuration, the lever 20 is secured in position relative to the shift rod 50.

Figure 4:
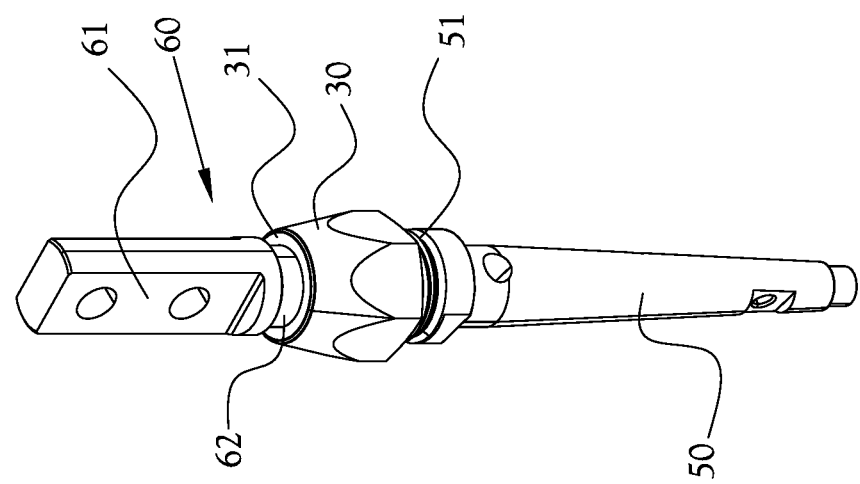
FIG. 4 is a perspective view of another embodiment of a shifter mechanism constructed in accordance with several features of the present general inventive concept, showing the shifter mechanism incorporating an adapter for coupling an upper portion of an aftermarket shift lever.

FIG. 4 shows another embodiment of the vehicle shifter mechanism 10 as assembled. In this embodiment, a lever 60 is provided having an upper end 61 defining an adapter of the type commonly marketed and sold for use in installing certain designs of aftermarket shift levers. A lower end 62 of the lever 60 defines a cylindrical outer shape having outer threads similar to those discussed above with respect to the embodiment of FIGS. 1-3. As with the embodiment described above, the embodiment of FIG. 4 includes a ferrule 40 having an inner diameter generally conforming to the outer diameter of the lower end 62 of the lever 60. Thus, the ferrule 40 can be placed over the lower end 62 of the lever 60. In the illustrated embodiment, the compression nut 30 is fully threaded onto the shift rod 50, surrounding the ferrule 40. In this configuration, the ferrule 40 is held in compression between the swaged opening 52 of the shift rod 50 and the annular collar 31 of the compression nut 30. Thus, compression force on the ferrule 40 establishes a secure connection between the lower end 62 of the lever 60 and the shift rod 50. While the illustrated embodiment includes an upper end 61 defining a particular adapter common to the aftermarket shift lever industry, it should be clear that numerous other types of shift levers and adapters therefor may be incorporated into the upper end of the lever 60 without departing from the spirit and scope of the general inventive concept.

Figure 5:
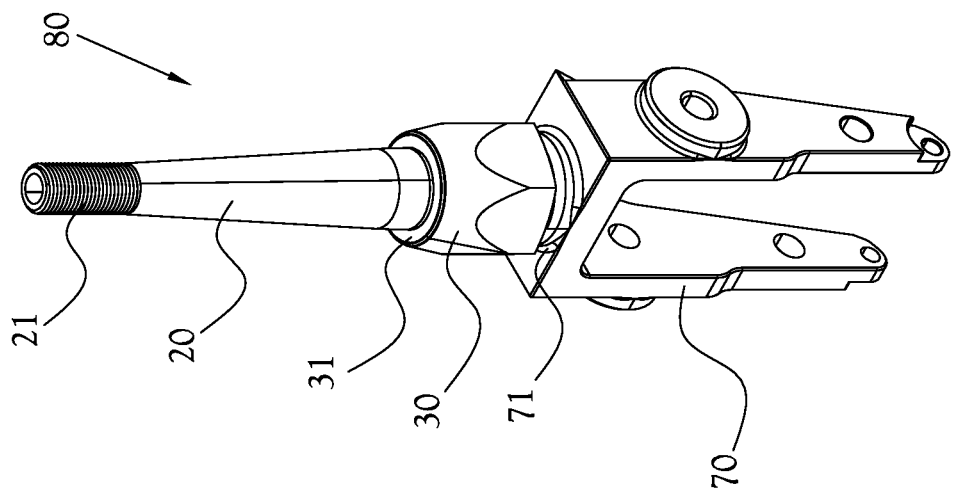
FIG. 5 is a perspective view of another embodiment of a shifter mechanism constructed in accordance with several features of the present general inventive concept, showing the shifter mechanism incorporating a shifter yoke mechanism.

FIG. 5 illustrates another embodiment of a vehicle shifter mechanism 80 constructed in accordance with several features of the present general inventive concept. In this embodiment, the shift rod 50 has been replaced with a different type of shift control member. Specifically, a shifter yoke 70 is provided of the type commonly used in connection with push-button style automatic shifters. The shifter yoke 70 defines an upper portion 71 having a similar size and shape as the upper end of the shift rod 50, described above. In other words, the shifter yoke upper portion 71 defines a substantially cylindrical outer surface defining threads along the upper end thereof. An upper end of the shifter yoke 71 defines an annular bore (not shown) extending from an upper surface of the shifter yoke 71 axially inwardly along a central axis of the shifter yoke 71 upper end. Similar to the embodiment discussed above, the bore is sized to receive therein lower portions of the ferrule 40 and the lever lower end 22. And, similarly to the embodiment discussed above, the bore defines an upper circumferential rim having an outwardly flared swaged opening which is sized and shaped to correspond with, and matably engage, the inwardly tapered portion of the lower end of the ferrule 40. Thus, the ferrule 40 and lower end 22 of the shift lever 20 may be secured to the shifter yoke upper portion 71 in a manner similar to that described in connection with the embodiment above. A lower portion of the shifter yoke 70 defines a pair of downwardly-extending arms having various indents, through openings, and other features of the type known for use in allowing the shifter yoke 70 to couple with and operatively engage various control portions of an automatic vehicle shifter.

In the embodiment of FIG. 5, the lever 20 is substantially tubular, that is, a through hole extends from an upper surface of the upper end 21 of the lever 20, along an axial dimension of the lever 20, and opens to a lower surface of the lower end 22 of the lever 20. Likewise, a through opening extends from the inside of the bore through the upper portion 71 of the shifter yoke 70, and opens to a lower portion of the shifter yoke 70. Thus, in the illustrated embodiment, a shifter cable, of the type commonly used in connection with push-button style automatic shifters, may extend from a lower portion of the shifter yoke 70, upward through the upper portion 71 of the shifter yoke 70, and through the lever 20 to the upper end 21 of the lever 20, thereby allowing for use of a push-button shifter knob in connection with the vehicle shifter mechanism 80.

From the foregoing description, it will be recognized by one of skill in the art that a vehicle shifter mechanism is provided which allows for relatively simple and convenient installation of a shift lever to a vehicle shifter, and which allows for convenient selective adjustability of the shift lever and associated shift knob. While the above-discussed embodiments have been provided for illustrative purposes, it will be recognized that other variations and embodiments constructed in accordance with features of the present general inventive concept may be possible. For example, in other embodiments, the above-discussed shift rod or shifter yoke may be replaced with a shifter body of the type known to one of skill in the art. Other such replacements are possible and should not be regarded as a departure from the spirit and scope of the present general inventive concept.

It is noted that the simplified diagrams and drawings included in the present application do not necessarily illustrate all the various connections and assemblies of the various components. However, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept. While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

Having thus described the aforementioned invention, what is claimed is:

1. A shifter mechanism comprising:
    a shift rod having an upper end defining an outer threaded portion and an inwardly tapered bore, and a lower end defining at least one shape for operatively engaging a control portion of a vehicle shifter;
    an annular compression ferrule defining a tapered lower portion configured to register with a portion of the inwardly tapered bore of the shift rod;
    a shifter lever having a lower end received within a through opening defined by the ferrule, the through opening sized to conform to the lower end of the shifter lever; and
    a locking nut configured to fit over the ferrule and to mate with the threaded portion of the shift rod to compress the tapered lower portion of the ferrule to the tapered bore;
    whereby compression of the ferrule between the locking nut and the shift rod serves to fix the shift lever to the shift rod.

2. The shifter mechanism of claim 1, wherein the bore is a blind bore extending from an upper surface of the shift rod inwardly along an axial dimension of the shift rod.

3. The shifter mechanism of claim 1, the ferrule being frictionally engaged by the shift lever lower end.

4. The shifter mechanism of claim 1, the shift rod further comprising an annular portion extending outwardly below the outer threaded portion of the shift rod, the annular portion defining a pair of oppositely disposed flat surfaces.

5. The shifter mechanism of claim 1, the locking nut further comprising an inwardly-extending annular collar configured to abut the ferrule.

6. The shifter mechanism of claim 5, the annular collar having an inner diameter corresponding to an outer diameter of the lower end of the shift lever.

7. The shifter mechanism of claim 6, the shift lever configured with an outer threaded portion proximate an upper end of the shift lever configured to receive a shift knob thereon.

8. The shifter mechanism of claim 7, the upper end of the shift lever having a smaller diameter than the lower end of the shift lever, the shift lever defining a tapered shape between the upper and lower ends thereof.

9. The shifter mechanism of claim 8, the shift rod lower end defining at least one indent configured to couple with and operatively engage a portion of a vehicle shifter.

10. The vehicle shifter mechanism of claim 1, wherein the collar has an internal diameter corresponding to an outer diameter of the shift lever lower portion.

11. The vehicle shifter mechanism of claim 1, wherein the ferrule is frictionally secured about the shift lever lower portion.

12. The vehicle shifter mechanism of claim 1, wherein the tapered lower portion of the ferrule is sized and shaped to correspond to the swaged opening of the bore.

13. The vehicle shifter mechanism of claim 1, wherein the shift control member defines an annular portion extending outwardly from a lower circumferential portion of the shift control member upper portion, the annular portion defining a pair of oppositely disposed flat surfaces.

14. A vehicle shifter mechanism comprising:
    a shift control member having an upper portion defining a cylindrical, threaded outer surface, and an annular bore extending from an upper surface of the shift control member axially inwardly along a central axis of the shift control member, the bore defining a swaged opening proximate the upper surface of the shift control member;
    a shift lever having a ferrule positioned proximate a lower portion of the shift lever, the ferrule defining an annular shoulder surrounding and extending outwardly from the shift lever lower portion, the ferrule further defining a tapered lower portion configured to be received within the swaged opening; and
    a compression nut having internal threads sized for matable engagement with the threaded outer surface of the shift control member upper portion, the compression nut having an inwardly-extending annular collar configured to abut the shoulder of the ferrule to secure the ferrule between the collar and the swaged opening;
    whereby, with the lower portion of the ferrule received within the bore, the compression nut is threadably mated with the shift control member upper portion to compress the ferrule between the collar and the swaged opening, thereby securing the ferrule and shift lever in fixed relation with the shift control member.

15. The vehicle shifter mechanism of claim 14, wherein the shift lever has an upper portion defining external threads for threadably receiving a shifter knob thereon.

16. The vehicle shifter mechanism of claim 14, wherein the upper portion of the shift lever defines a cylindrical outer shape, and wherein the lower portion of the shift lever defines a cylindrical outer shape having a diameter greater than or equal to a diameter of the cylindrical outer shape of the upper portion of the shift lever.

17. The vehicle shifter mechanism of claim 16, wherein the shift lever defines a gradual taper between the upper portion of the shift lever and the lower portion of the shift lever.

18. A vehicle shifter mechanism comprising:
    a shift control member having an upper portion defining a cylindrical, threaded outer surface, and an annular bore extending from an upper surface of the shift control member axially inwardly along a central axis of the shift control member, the bore defining a swaged opening proximate the upper surface of the shift control member, the shift control member defining an annular portion extending outwardly from a lower circumferential portion of the shift control member upper portion, the annular portion defining a pair of oppositely disposed flat surfaces;
    a shift lever having a ferrule frictionally secured proximate a lower portion of the shift lever, the ferrule defining an annular shoulder surrounding and extending outwardly from the shift lever lower portion, the ferrule further defining a tapered lower portion configured to be received within the swaged opening, the tapered lower portion of the ferrule being sized and shaped to correspond to the swaged opening of the bore, the shift lever having an upper portion defining external threads for threadably receiving a shifter knob thereon, the upper portion of the shift lever defining a cylindrical outer shape, and the lower portion of the shift lever defining a cylindrical outer shape having a diameter greater than or equal to a diameter of the cylindrical outer shape of the upper portion of the shift lever, the shift lever defining a gradual taper between the upper portion of the shift lever and the lower portion of the shift lever; and a compression nut having internal threads sized for matable engagement with the threaded outer surface of the shift control member upper portion, the compression nut having an inwardly-extending annular collar configured to abut the shoulder of the ferrule to secure the ferrule between the collar and the swaged opening, the collar having an internal diameter corresponding to an outer diameter of the shift lever lower portion;

whereby, with the lower portion of the ferrule received within the bore, the compression nut is threadably mated with the shift control member upper portion to compress the ferrule between the collar and the swaged opening, thereby securing the ferrule and shift lever in fixed relation with the shift control member.

* * * * *